United States Patent
Hull

(10) Patent No.: US 9,560,474 B2
(45) Date of Patent: *Jan. 31, 2017

(54) DEVICE FOR TRANSFERING DATA BETWEEN AN UNCONSCIOUS CAPTURE DEVICE AND ANOTHER DEVICE

(71) Applicant: RICOH CO., LTD., Tokyo (JP)

(72) Inventor: Jonathan J. Hull, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/579,867

(22) Filed: Dec. 22, 2014

(65) Prior Publication Data

US 2015/0172850 A1    Jun. 18, 2015

Related U.S. Application Data

(63) Continuation of application No. 11/708,718, filed on Feb. 20, 2007, now Pat. No. 8,918,649, which is a
(Continued)

(51) Int. Cl.
*G06F 21/62* (2013.01)
*H04W 4/00* (2009.01)
(Continued)

(52) U.S. Cl.
CPC .......... *H04W 4/008* (2013.01); *G06F 15/0225* (2013.01); *G06F 17/30864* (2013.01); *G06F 21/6209* (2013.01); *G06F 21/79* (2013.01); *G06F 21/85* (2013.01); *H04L 9/14* (2013.01); *H04L 63/0428* (2013.01); *H04N 1/00127* (2013.01); *H04N 1/4486* (2013.01); *H04W 12/02* (2013.01); *H04L 2209/24* (2013.01); *H04N 2201/0055* (2013.01);
(Continued)

(58) Field of Classification Search
None
See application file for complete search history.

(56) References Cited

U.S. PATENT DOCUMENTS 5,222,234 A     6/1993  Wang et al.
5,278,979 A  *  1/1994  Foster et al.
(Continued)

FOREIGN PATENT DOCUMENTS

EP     691619 A2  *  1/1996  ............. G06F 15/02
EP     0691619 A2     1/1996
(Continued)

OTHER PUBLICATIONS

Japanese Office Action for corresponding Japanese Patent Application No. 2000-322132, Dec. 22, 2009, 20 pages.
(Continued)

*Primary Examiner* — Benjamin Lanier
(74) *Attorney, Agent, or Firm* — Blakely, Sokoloff, Taylor & Zafman LLP

(57) ABSTRACT

Apparatuses and methods are disclosed for accessing and distributing data that includes a portable first device and a second device wherein both devices have unconscious capture capability. The first device has a first memory wherein at least one document is stored in the first memory of the first device. The first device has a transceiver, an identifier, and a public key to access a second device.

18 Claims, 3 Drawing Sheets

PROPOSED SHUTTLE MEMORY APPLIANCE (SMA) SYSTEM

Related U.S. Application Data continuation of application No. 11/477,092, filed on Jun. 27, 2006, now Pat. No. 7,181,013, which is a continuation of application No. 10/874,885, filed on Jun. 22, 2004, now Pat. No. 7,085,384, which is a continuation of application No. 09/428,129, filed on Oct. 26, 1999, now Pat. No. 6,772,338.

(51) Int. Cl.

| | | |
|---|---|---|
| G06F 15/02 | (2006.01) | |
| G06F 21/79 | (2013.01) | |
| G06F 21/85 | (2013.01) | |
| H04L 29/06 | (2006.01) | |
| H04N 1/00 | (2006.01) | |
| H04N 1/44 | (2006.01) | |
| H04W 12/02 | (2009.01) | |
| G06F 17/30 | (2006.01) | |
| H04L 9/14 | (2006.01) | |

(52) U.S. Cl.
CPC ........... *H04N 2201/0087* (2013.01); *H04N 2201/0091* (2013.01); *H04N 2201/0096* (2013.01)

(56) References Cited

U.S. PATENT DOCUMENTS

| | | | |
|---|---|---|---|
| 5,572,583 A | | 11/1996 | Wheeler, Jr. et al. |
| 5,666,530 A | * | 9/1997 | Clark et al. |
| 5,708,810 A | | 1/1998 | Kern et al. |
| 5,742,816 A | | 4/1998 | Barr et al. |
| 5,748,084 A | | 5/1998 | Isikoff |
| 5,749,083 A | | 5/1998 | Koda et al. |
| 5,793,498 A | | 8/1998 | Scholl et al. |
| 5,826,261 A | | 10/1998 | Spencer |
| 5,838,798 A | * | 11/1998 | Stevens, III .................. 705/21 |
| 5,845,278 A | | 12/1998 | Kirsch et al. |
| 5,845,304 A | | 12/1998 | Iijima |
| 5,848,410 A | | 12/1998 | Walls et al. |
| 5,861,959 A | | 1/1999 | Barak |
| 5,862,321 A | | 1/1999 | Lamming et al. |
| 5,880,855 A | | 3/1999 | Ishikawa |
| 5,905,980 A | | 5/1999 | Masuichi et al. |
| 5,907,837 A | | 5/1999 | Ferrel et al. |
| 5,913,040 A | | 6/1999 | Rakavy et al. |
| 5,920,854 A | | 7/1999 | Kirsch et al. |
| 5,923,845 A | | 7/1999 | Kamiya et al. |
| 5,924,090 A | | 7/1999 | Krellenstein |
| 5,946,701 A | | 8/1999 | Hamada |
| 5,978,477 A | | 11/1999 | Hull et al. |
| 5,983,216 A | | 11/1999 | Kirsch et al. |
| 5,995,956 A | | 11/1999 | Nguyen |
| 6,014,681 A | | 1/2000 | Walker et al. |
| 6,100,890 A | | 8/2000 | Bates et al. |
| 6,195,725 B1 | | 2/2001 | Luhmann |
| 6,263,332 B1 | | 7/2001 | Nasr et al. |
| 6,363,377 B1 | | 3/2002 | Kravets et al. |
| 6,370,527 B1 | | 4/2002 | Singhal |
| 6,438,594 B1 | * | 8/2002 | Bowman-Amuah ......... 709/225 |
| 6,442,589 B1 | | 8/2002 | Takahashi et al. |
| 6,456,305 B1 | | 9/2002 | Qureshi et al. |
| 6,476,827 B1 | | 11/2002 | Porter |
| 6,484,162 B1 | | 11/2002 | Edlund et al. |
| 6,591,261 B1 | | 7/2003 | Arthurs |
| 6,601,061 B1 | | 7/2003 | Holt et al. |
| 6,804,674 B2 | | 10/2004 | Hsiao et al. |
| 6,832,221 B2 | | 12/2004 | Takahashi |
| 6,882,659 B1 | * | 4/2005 | Novak et al. ................. 370/466 |
| 7,386,599 B1 | | 6/2008 | Piersol et al. |
| 7,403,769 B2 | * | 7/2008 | Kopra et al. ............... 455/414.1 |
| 2002/0085037 A1 | * | 7/2002 | Leavitt et al. ................ 345/765 |
| 2004/0179545 A1 | * | 9/2004 | Erola et al. .................. 370/449 |
| 2005/0108351 A1 | * | 5/2005 | Naick et al. ................. 709/207 |
| 2005/0228897 A1 | * | 10/2005 | Yamamoto et al. .......... 709/231 |
| 2005/0235019 A1 | * | 10/2005 | Yang .............................. 707/204 |
| 2006/0006217 A1 | | 1/2006 | Bickley |
| 2006/0055538 A1 | | 3/2006 | Ritter |
| 2006/0078917 A1 | | 4/2006 | Mishra et al. |
| 2006/0088675 A1 | | 4/2006 | Hladik et al. |
| 2007/0198746 A1 | * | 8/2007 | Myllyla et al. ............... 709/248 |
| 2007/0260751 A1 | * | 11/2007 | Meesseman .................. 709/248 |
| 2008/0194276 A1 | * | 8/2008 | Lin et al. ...................... 455/466 |

FOREIGN PATENT DOCUMENTS

| | | |
|---|---|---|
| EP | 0883272 A2 | 12/1998 |
| GB | 2325766 A | 12/1998 |
| JP | 09-505449 | 5/1997 |
| JP | 11-289323 | 10/1999 |
| WO | WO 94/12938 | 6/1994 |

OTHER PUBLICATIONS

Derwent ACC-No. 1999-274427, Information Process Apparatus Information with Information Search Function . . . , Priority-Sep. 1997, Copyright 1999 Derwent Information Ltd, Japanese Patent.

* cited by examiner

PROPOSED SHUTTLE MEMORY APPLIANCE (SMA) SYSTEM

DEVICE FOR TRANSFERING DATA BETWEEN AN UNCONSCIOUS CAPTURE DEVICE AND ANOTHER DEVICE

PRIORITY

This is a continuation of U.S. Pat. No. 8,918,649 issued on Dec. 23, 2014, entitled "A Device for Transferring Data Between an Unconscious Capture Device and Another Device" which is a continuation of U.S. Pat. No. 7,181,013, issued on Feb. 20, 2007, entitled "A Device for Transferring Data Between an Unconscious Capture Device and Another Device," which is a continuation of U.S. Pat. No. 7,085,384, issued on Aug. 1, 2006, entitled "A Device for Transferring Data Between an Unconscious Capture Device and Another Device," which is a continuation of U.S. Pat. No. 6,772,338, issued on Aug. 3, 2004, entitled "A Device for Transferring Data Between an Unconscious Capture Device and Another Device," all assigned to the corporate assignee of the present invention and incorporated herein by reference.

BACKGROUND OF THE INVENTION

Field of the Invention

This invention relates generally to devices capable of unconscious capture capability. More specifically, the invention relates to the unconscious capture of documents with a portable electronic device and the transfer of such documents using the portable device.

Description of Related Art

Electronically transferring documents between various devices has become an integral part of the work environment. However, the capability to transfer documents between mobile devices is very limited. Usually, in order to send or receive documents with mobile devices, an individual must make a conscious decision to transfer the information. That is, documents are not transferred until the individual performs some action or actions that enable the transfer to occur. Increasingly, it is desirable to have devices capable of unconsciously transferring documents between a mobile device and another device without an individual making a conscious decision to do so and, thus, without the individual having to take action(s) to cause the transfers to occur.

Systems for accessing and distributing electronic documents are well known in the art. For example, U.S. Pat. No. 5,862,321 issued to Lamming describes a system in FIG. 1 in which a portable device transfers a Universal Resource Locator (URL) to office equipment such as a copier, a facsimile machine, or a printer. Referring to FIG. 1, the office equipment uses the URL to access a document stored on a server. For example, the portable device sends a URL to a printer, which accesses the document from a document database using the URL, in order to print the document. One problem with the system of the '321 patent is that when the document is stored on a network system, the document is not secure from others that have access to the network system. In other words, the document is being transferred to the printer and its only security is based on whether the URL is known or not. Another difficulty in the system of the '321 patent is that the operation of the portable device receiving a URL is performed in response to an explicit user request. To request the device to perform its function, the user must enter some recognizable user identification to the device. Thus, the operation of the device is not unconscious, but instead is conscious.

Another prior art device referred to as the "HP CapShare 910" manufactured by Hewlett Packard Corporation of Palo Alto, Calif., is a device that is also capable of transferring a document to a facsimile machine. The HP CapShare 910 system includes a scanner for scanning information and transferring the scanned image to the facsimile machine. This device has the same limitations as the device described above with respect to the system in the '321 patent. Additionally, the user of this device must have authorization by way of user identification to transfer a document to a facsimile machine. Accordingly, conventional devices are limited in that a document must be stored on a second device before an act is performed on the document by the second device. Additionally, these devices do not operate with unconscious capture capability. Therefore, it is desirable to have a system capable of transferring documents between unconscious capture devices.

SUMMARY OF THE INVENTION

A portable apparatus as described. In one embodiment, the portable apparatus comprises a wireless transceiver, a memory, and a processor. The wireless transceiver receives, via wireless communication, a document being unconsciously captured by a first device and to transmit the document to a second device, such that communication of the document occurs between the first and second devices. The memory is coupled to the transceiver and stores the document. The processor is coupled to the transceiver and the memory, and controls the transceiver to cause the transceiver to receive the document unconsciously from the first device and to transfer the document as part of being downloaded to the second device.

BRIEF DESCRIPTION OF THE DRAWINGS

The features, aspects, and advantages of the invention will become more thoroughly apparent from the following detailed description, appended claims, and accompanying drawings in which:

DETAILED DESCRIPTION OF THE INVENTION

Figure 1:
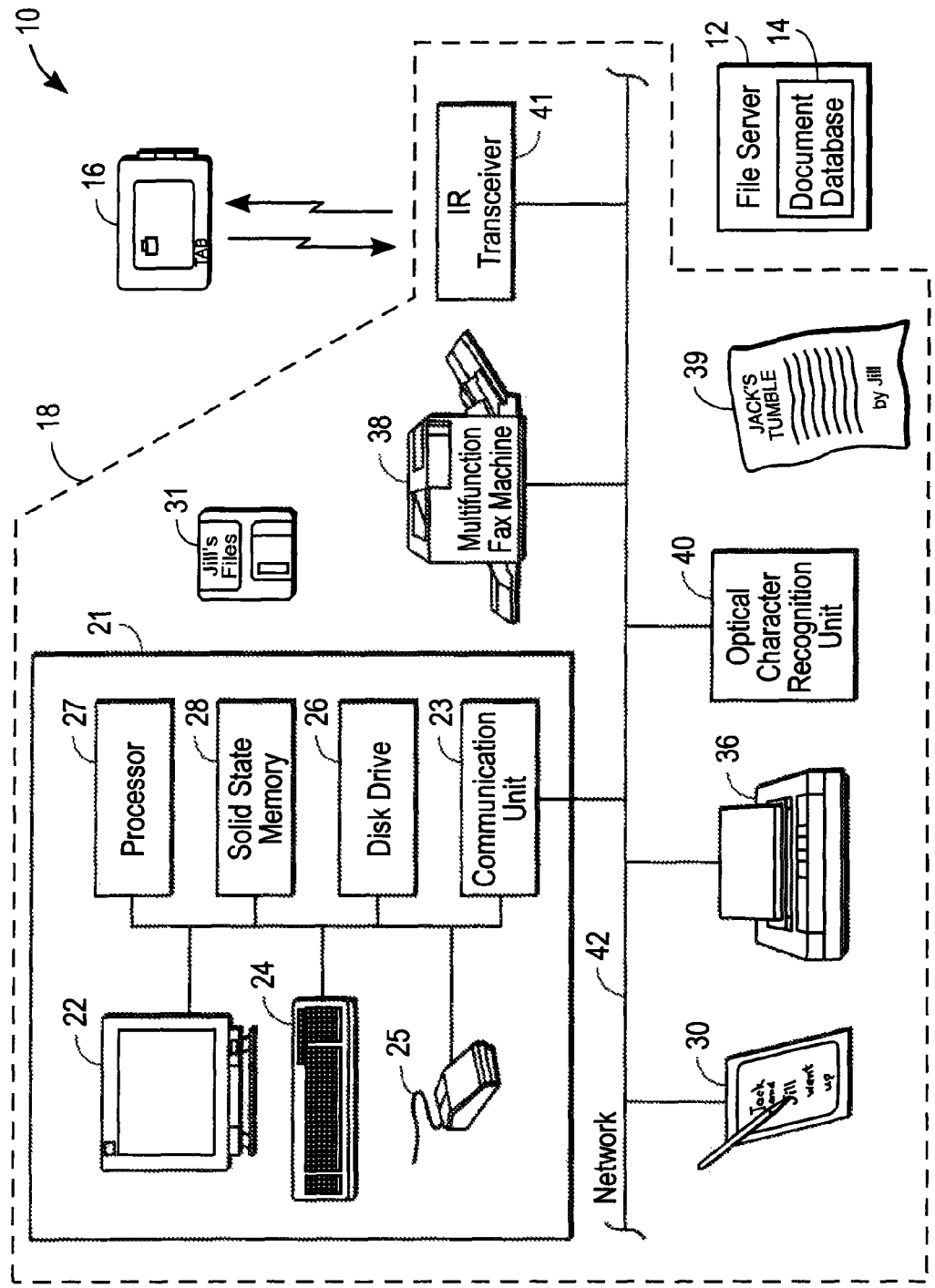
FIG. 1 is a prior art system which transfers URLs to devices that access the document using the URLs.

The present invention relates to accessing and transferring data from a device with unconscious capture to a portable device and then from the portable device to a third device. In one embodiment, the portable device has a memory capacity to store at least one document and a transceiver for receiving documents and transferring documents to another device, such as a personal computer.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

In one embodiment, the portable device is a Shuttle Memory Appliance (SMA) that may be used for unconscious transfer of documents between office appliances (e.g., devices, equipment, peripherals, etc.) and document databases. In one embodiment, the SMA is packaged as a device carried on a belt (like a pager). The SMA has a mechanism for wireless communication and data transfer, a buffer memory (e.g., flash, disk, etc.), and a processor. The SMA is carried by users of SMA-capable unconscious capture devices, such as, for example, photocopiers, facsimile machines, multifunction machines, etc. In the case of the photocopier, when the users make copies on the photocopier, the scanned electronic versions of the copied documents are transferred unconsciously to the SMA. When the user returns to their personal computer (PC), the data on the SMA is unconsciously downloaded to a memory in the PC. In one embodiment, automatic indexing software is triggered on the PC and prepares the document for later retrieval.

In another embodiment, the transfer is conscious; the original devices (copier, fax, printer, PC) may contain a user interface that is used to confirm data should be transferred to the SMA before the transfer occurs. For example, the user walks up to the copier, it detects there is an SMA present, and indicates this on the console. The user has the opportunity to confirm transfer to the SMA before it occurs.

Using the SMA is advantageous in that it solves a significant security problem for users of unconscious capture devices. The images that are created do not have to exist on a local area network. They can be stored only on the user's PC. The user can then enforce whatever security protection on access to the document they desire. Using the SMA also solves the user identification and routing problem for users of unconscious capture devices. In one embodiment, users are not required to identify themselves to the device by, for example, pressing a button. The SMA performs this identification function automatically when the SMA is within communication range with the unconscious capture device.

In the following description, numerous specific details such as various parameters, steps, etc. are set forth in order to provide a thorough understanding of the invention. One skilled in the art will recognize that these details need not be specifically adhered to in order to practice the claimed invention. In other instances, well known steps, etc. are not set forth in order to avoid obscuring the invention.

Figure 2:
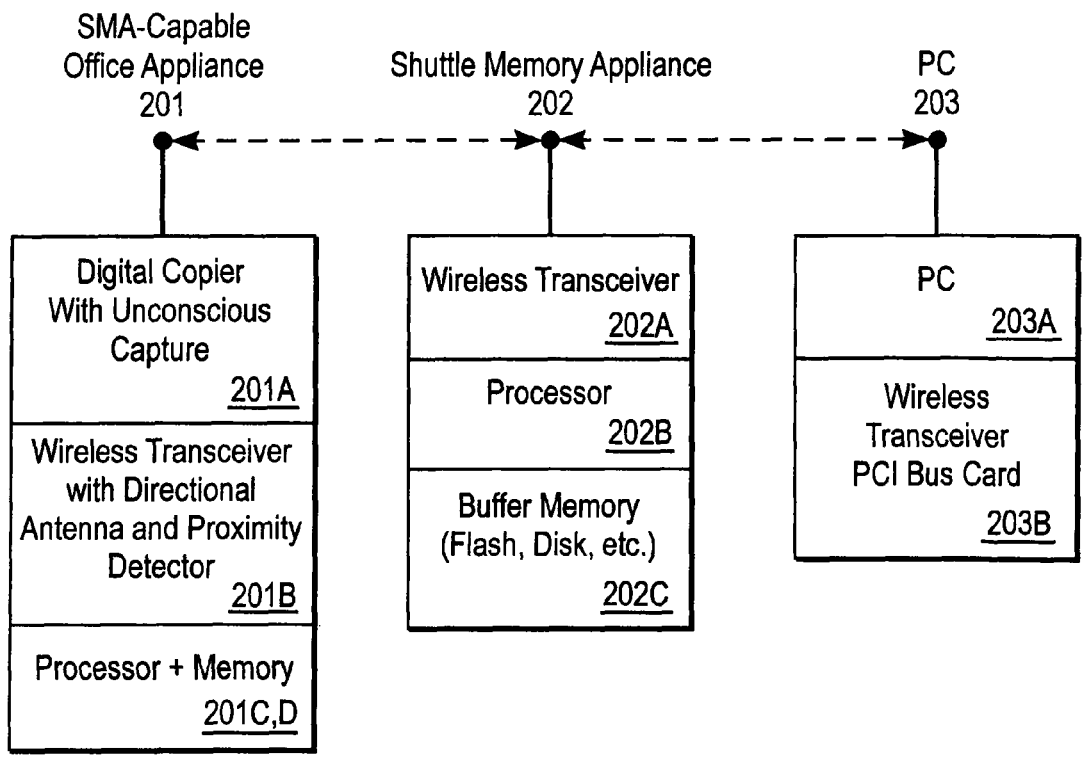
FIG. 2 is a block diagram illustrating one embodiment of a system having an unconscious capture device.

FIG. 2 illustrates a system having an SMA-capable office appliance (OA), an SMA and a PC. Referring to FIG. 2, the SMA-capable office appliance 201 includes a multifunction machine with unconscious capture capability 201A, a wireless transceiver 202B, a processor 201C, and a memory 201D. The unconscious capture capability 201 refers to the ability and (functionality) of appliance 201 to create a copy of the document, such as for archival purposes, whenever the device is performing its normal function. For more information on unconscious devices, see U.S. patent application Ser. No. 08/754,721 entitled "Automatic and Transparent Document Archiving," filed Nov. 21, 1996, assigned to the corporate assignee of the present invention and incorporated herein by reference.

In one embodiment, appliance 201 comprises a digital copier. Appliance 201 performs unconscious capture in that an electronic version of a document is created for archival purposes while making a copy of the document (in the case of a copier). Appliance 201 could also be a scanner. Such a scanner could be an expensive high speed device. In an alternative embodiment, appliance 201 may comprise a facsimile (fax) machine, or a printer, etc.

In one embodiment, the transceiver 202B comprises a radio frequency (RF) transceiver. Such an RF transceiver may include a highly directional antenna and a proximity detector for use in distinguishing SMA 202 from other SMAs.

In one embodiment, appliance 201 includes processor 201C which controls operation of appliance 201. Processor 201C may be used to encrypt the data before it is transmitted to SMA 202. A public key system could be used with the public key being transmitted to appliance 201 by SMA 202.

In one embodiment, appliance 201 includes a touchscreen user interface to indicate when appliance 201 detects more than one possible destination SMA. The user could indicate the correct destination. In another embodiment, the touchscreen user interface indicates the identity of the destination SMA or its registered user. The user could confirm the identification prior to the data being transferred between the appliance 201 and the SMA 202. The user might also be required to enter a password to confirm his identity.

SMA 202 eliminates the need for a network connection. Users of SMA 202 would also not be required to explicitly indicate the destination for the scanned documents. This would be performed implicitly by SMA 202.

In one embodiment, SMA 202 includes a processor 202A, a wireless transceiver 202B (preferably RF), a buffer memory 202C, and a touchscreen or a simple display (not shown) plus a keypad (not shown). Processor 202A manages the communication process, including sending the public key of the user to appliance 201 as necessary. Processor 202A also performs the required memory management functions. The operating system and any application-like software run on SMA 202 may include open source alternatives like Linux.

A document is stored in appliance 201 and may be transferred to SMA 202 through an RF link, through an infrared (IR) link, or any wireless communication machine. If an IR link is used, appliance 201 and SMA 202 have IR ports that must be in a direct line of vision in order to transfer the document. If an RF link is used, the signal coming from appliance 201 to SMA 202 simply needs to be transmitted without requiring ports to be directly aligned. Prior to document transfer, SMA 202 transmits information to appliance 201 for identification. In one embodiment, this information is used by appliance 201 to select an encryption scheme which the user desires to use or is able to determine its use. In one embodiment, the identification information allows appliance 201 to identify which public key to use to encrypt the document prior to transfer to SMA 202.

In one embodiment, buffer memory 202E comprises a flash memory or a Smartmedia memory from Delkin Devices of San Diego, Calif. for storing documents received from appliance 201. The user interface on appliance 201 allows the user to indicate an action to be performed on the data once it reaches PC 203. Actions might include electronic mailing or faxing. In this manner, the user can specify an operation to be performed on the stored document as soon as it is downloaded to PC 203.

In one embodiment, SMA 202 also sends information notifying appliance 201 not to archive the document being copied, printed, faxed, etc., onto the network. This information may be the same as the identification information. That is, the fact that an SMA 202 is in proximity to appliance 201 and sends information to appliance 201 may cause appliance 201 to automatically stop the automatic retention of an electronic version of the document.

In one embodiment, once document transfer has been completed, SMA 202 sends a signal to appliance 201 and informs the user that the document transfer has been completed. Appliance 201 may inform the user in a variety of methods. For example, appliance 201 may have a display with a graphical user interface that may be used for informing the user that the document transfer has been completed. An icon, textual information, or other communication machine may be shown on the display. In another embodiment, appliance 201 may emit a sound to indicate that document transfer has been completed.

After receiving a document from appliance 201, the SMA 202 may be used to specify an operation to be performed on the document. The operation may include printing the document, e-mailing the document, faxing the document, encrypting the document, storing the document, or any other type of operation, such as transferring the document to a third device or multiple devices. The user may specify the operation using an input device (e.g., keypad, styles, etc.) on SMA 202. After SMA 202 specified one or more operations to be performed on the document, SMA 202 may optionally encrypt the document and then transfer the document to PC 203. PC 203 then stores the document as a new document or replaces the old document with the document transferred from SMA 202 and performs the specified operation(s).

In one embodiment, PC 203 is equipped with a wireless transceiver 203A compatible with SMA 202 as well as the necessary driver and application-level software (not shown). This software runs in the background, e.g., as a Windows Service or Unix daemon. In one embodiment, in normal operation, the software would monitor a specific frequency and periodically attempt to establish communication with its SMA. If successful, it would query whether there are any new documents on SMA 202. If there is one or more new documents, they would be transferred to PC 203. Once stored on PC 203, the documents could optionally be decrypted and stored. In this manner, the downloads can be performed unconsciously for the user.

In one embodiment, initialization of SMA 202 is performed by software on the PC 203. In one embodiment, at initialization, this software prompts the user for the serial number of SMA 202 as well as the user's public key. Using this information, the software establishes communication with SMA 202 and sends it the appropriate initialization commands. A user's interaction with SMA 202 could be very limited, it may be as little as changing batteries or tending to certain error conditions, such as memory overflow or hardware reset.

In one embodiment, SMA 202 and PC 203 may be coupled in communication using a cable. However, in such a case, the download is no longer unconscious. The documents might also undergo optical character recognition and be indexed for later retrieval.

Figure 3:
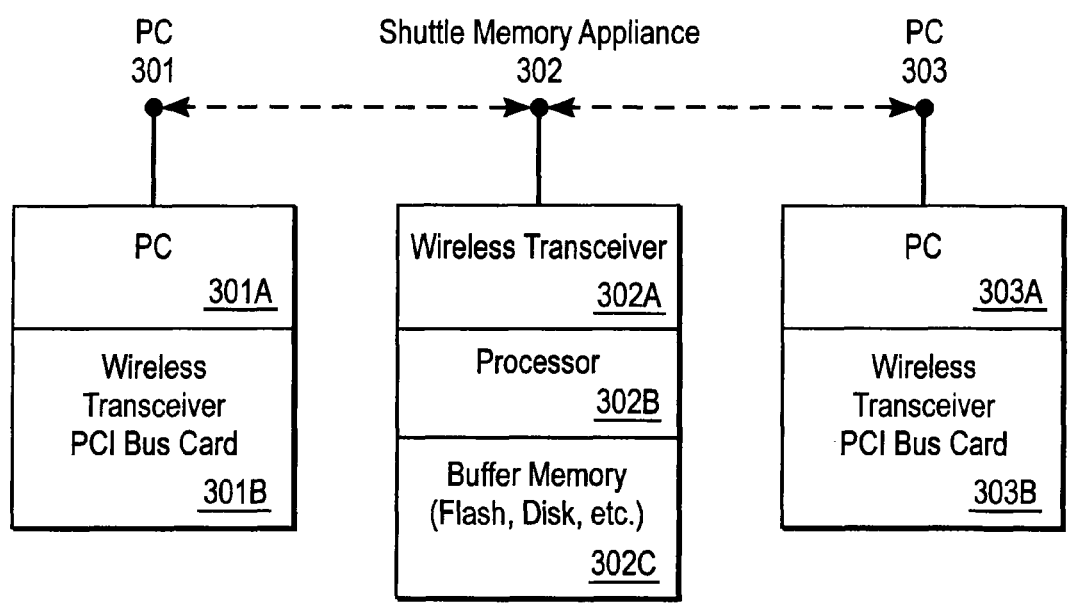
FIG. 3 is a block diagram of an alternative embodiment of the SMA that synchronizes files between two or more PC's.

An SMA system could be used to synchronize data between PC's, exclusive of any office appliances. This would allow users to seamlessly maintain the same data on their office PC and their PC at home. FIG. 3 is a block diagram of an alternative embodiment of the SMA that synchronizes files between two or more PC's. This is useful for ensuring that the same data is present on the PCs. Every time a user sits down in front of such a PC and opens a file (e.g., a Microsoft Word document), the contents of that file are guaranteed to be the same, no matter which PC the file is opened on. The state-of-the-art requires a manually operated (i.e., conscious) step. Users must insert a device in a cradle, aim a device at an IR receiver and press a button, insert a disk into a disk drive, etc. The system of FIG. 3 eliminates this bothersome and error-prone process by communicating unconsciously with two or more PCs 301 and 303. Every time PC 301 is in proximity to SMA 302, files are transferred to PC 303 via SMA 302 over a wireless communication link using wireless transceiver 301B (e.g., wireless transceiver PCI bus card) of PC 301 and wireless transceiver 302A of SMA 302. At this time, files on SMA 302 that had been uploaded to it by PC 303 (and stored in buffer memory 302C) for transfer to PC 301 are sent to PC 301 over a wireless communication link using wireless transceiver 301B and wireless transceiver 302A. The analogous operations are performed when SMA 302 is in proximity to PC 303.

In one embodiment, software is installed on each PC that uses an SMA for file synchronization. Files may be synchronized between more than two PCs. In one embodiment, this application may contain a user interface, a data structure, an operating system upgrade, and software for communication with an SMA. Upon installation on a first PC (e.g., PC 301), a user indicates (using the user interface) his/her identity, encryption/decryption passwords, files that should be exported from the PC, as well as the identity of at least one SMA that are to be used to transfer data between various PCs. The user can also indicate the identity of other PCs (e.g., PC 303) that are to receive data from the first PC. This could be entered manually or it could be selected from a list of alternatives downloaded from SMA 302. In one embodiment, this list includes PCs (other than 301) that communicated with SMA 302 in the past. The data downloaded from SMA 302 may also indicate whether the other PCs (e.g., PC 303) are ready to export any files or directories. In one embodiment, the user indicates whether he/she would like to receive them.

In one embodiment, the destination on PC 301 where files from PC 303 are stored is indicated on the user interface. This destination may be exactly the same location the file is stored on PC 303. In this case, the system maintains a mirror (location and contents being the same) of those files and directories. Alternatively, the destination where the files from PC 303 are stored on PC 301 is different (e.g., C:\PC303).

The files or directories that a user would like to export from any particular PC are selected with the user interface. Specific files or directories, or entire directory hierarchies may be selected. For example, a user might indicate that every file in the C:\PROGRAMS hierarchy should be exported. The target PC and destination directory for these files on the target PC can also be selected at this time.

The data structure maintained by the software application on PC 301 includes a description of the files and directories that are being exported and imported. This description includes their location (e.g., path name), size, date of last modification, date of last transfer to (or receipt from) SMA 302, and one or more checksum values (e.g., MD5 and CRC are well known checksum algorithms). The data structure also maintains information about other PCs (e.g., PC 303) that communicate with PC 301 via SMA 302. In one embodiment, this includes the identifies of those PCs, information about the status of the communication between them (e.g., the last time files were exchanged was 5 days ago), and information about the update status of individual files and directories on PC 303 (e.g., C:\PROGRAMS\WORD\WORD.DLL was last modified 23 days ago).

In one embodiment, an operating system upgrade is included to trigger another application whenever a FILE SAVE operation is performed. A modification to the file system performs an interrupt every time a file is saved to disk. The interrupt service routine is passed the name of the file being saved. The interrupt service routine passes this name to the communications software and returns control to the calling application. In an alternative embodiment, a modification to the disk controller driver software performs an interrupt every time it writes a block to a physical disk drive. The interrupt service routine is passed an identification for the block and information that allows it to identify the file in which the block occurs. The interrupt service routine passes this identification to the communications software and returns control to the calling application. In both cases (file system trigger or disk controller trigger), the data structure may be queried and the interrupt performed if the data being written occurs in a file that is being exported or imported. This check could also be done in the interrupt service routine, thereby preventing unnecessary calls to the communications software. In any case, every time a file or block is written, the system data structure is updated and a dirty bit for that file indicating the file or block has been written is set to 1. A value of 1 for the dirty bit indicates that the file has been changed, but the data in the file has not been written to an SMA yet.

The communications software on the PC establishes communication with SMAs in its vicinity, as described earlier, and transfers data between the PC and the SMA. After communication is first established (after some interruption), the PC asks the SMA whether it has any files that need to be downloaded. These candidates are files that were uploaded to the SMA at some time in the past (by some other PC) and have never been downloaded to the PC. The SMA supplies the PC the names of these files, their destinations (if known), their last date of modification, their sizes, and their checksums. The communications software compares the information for each candidate file to copies of the candidate file on the PC (if they exist). Information about the copies can be extracted from the data structure. If the last modification time of the candidate file is newer than its copy on the PC and the files are different (e.g., as indicated by the checksum, difference in sizes, or a direct comparison), the candidate file overwrites the copy. Instead of overwriting the file, the candidate might be maintained as a copy on the PC, perhaps indicated by a modified file name and such as an appended version number. The user might also be prompted for confirmation before any file is overwritten.

In one embodiment, the PC dynamically uploads data to the SMA. In one embodiment, this procedure includes an initialization mode and a continuous mode. After establishing communication (after some interruption) and performing the download as described above, the communications software enters upload initialization mode. Any files the data structure indicates have either never been uploaded or changed since the last time they were uploaded are now transferred to the SMA. The data structure is modified to indicate this has occurred. In one embodiment, this includes setting the dirty bit for these files to 0.

Continuous upload mode is entered after initialization is complete and maintained for as long as communication is maintained between the PC and the SMA. Every time a file is modified (as directed by the operating system update), either the entire file or a portion of it is transformed to the SMA. The entire file is transferred if no copy of it exists on the SMA. Otherwise, a file differencing utility is applied to the PC and SMA versions, where the SMA version is the previous version sent to the SMA and only the differences are transferred to the SMA. This can significantly reduce bandwidth usage on the PC bus and in the wireless channel. In one embodiment, the SMA is part of a cell phone. If this is not a significant consideration, the entire file might be transferred every time it is changed.

In one embodiment, the upload mode described herein is dynamic. Previous methods for the synchronization require that an explicit conscious operation be performed (docking, insertion of diskette, pressing a button, etc.) before a user leaves the console of a PC. Dynamic updating, performed unconsciously, allows the user to leave from the console of a PC without performing any conscious act and still allow files to be synchronized with a different PC at some later time.

The SMA performs communications between unconscious capture devices and PCs while ensuring that the documents are only stored on the PC and not on a network. The use of the SMA also identifies the user of an unconscious capture device and eliminates the requirement of having the user log in.

In one embodiment, the SMA and/or PC may comprise a network attached server that receives documents from unconscious capture devices. One embodiment of such a server is described in U.S. patent application Ser. No. 09/410,494, entitled "An Appliance to Mingle Content from an Unconscious Capture and Retrieval System and an Internet Portal," filed Sep. 30, 1999, assigned to the corporate assignee and incorporated herein by reference.

In one embodiment, the SMA is part of a cell phone.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A cell phone comprising:
    a wireless transceiver to receive, via wireless communication, a document from a first device and to transfer the document to a second device;
    a memory coupled to the transceiver to store the document; and
    a processor coupled to the transceiver and the memory, the processor to control the transceiver to cause the transceiver to receive the document from the first device and to cause the transceiver to receive a query from the second device, and in response to an indication that the document is included in one or more documents to be downloaded, to cause the transceiver to transfer the document to the second device, wherein the document received by the wireless transceiver is encrypted with a first key, and further wherein the processor is to decrypt the document using a second key.

2. The cell phone defined in claim 1 wherein the document is received by the wireless transceiver without user intervention.

3. The cell phone defined in claim 1 wherein the query is received by the wireless transceiver without user intervention.

4. The cell phone defined in claim 1 wherein the document is transmitted by the wireless transceiver without user intervention.

5. The cell phone defined in claim 1 wherein, without user intervention, the document is received by the wireless transceiver, the query is received by the wireless transceiver, and the document is transmitted by the wireless transceiver.

6. The cell phone defined in claim 1 wherein the processor is to cause the transceiver to receive, via wireless communication, the query from the second device, the query requesting an indication as to whether the memory contains the one or more documents to be downloaded.

7. The cell phone defined in claim 1 wherein the document is received when the transceiver is proximate to the first device, and further wherein the document is transferred when the transceiver is proximate to the second device.

8. The cell phone defined in claim 1 wherein the processor is operable specifying an operation to be performed on the document by the second device and causes the wireless transceiver to transmit an indication of the operation to the second device.

9. The cell phone defined in claim 8 wherein operation comprises printing, e-mailing, faxing, encrypting, and storing.

10. The cell phone defined in claim 1 wherein an index is generated from the document, and further wherein the wireless transceiver transmits the document and the index to the second device.

11. The cell phone defined in claim 1 further comprising a proximity detector to determine when the wireless transceiver is near the second device.

12. A cell phone comprising:
    a wireless transceiver to receive, via wireless communication, a document from a first device and to transfer the document to a second device;
    a memory coupled to the transceiver to store the document; and
    a processor coupled to the transceiver and the memory, the processor to control the transceiver to cause the transceiver to receive the document from the first device and to cause the transceiver to receive a query from the second device, and in response to an indication that the document is included in one or more documents to be downloaded, to cause the transceiver to transfer the document to the second device, wherein the processor sends a key to the first device and the document is received encrypted with the key.

13. A method comprising:
    receiving, by a cell phone, a document from a first device;
    storing, by the cell phone, the document in memory; and
    transferring, by the cell phone, the document to a second device, such that communication of the document occurs between the first and second devices, wherein transferring the document to the second device occurs when the cell phone is in proximity to the second device and in response to a query from the second device with respect to whether the document is to be downloaded to the second device, wherein the document is encrypted, and further comprising:
        storing an index generated from the document for later retrieval,
        receiving a first key from the first device, wherein the first key was utilized to encrypt the document, and
        transferring, via wireless communication, the index, the first key and the document to a second device when the cell phone is proximate to the second device.

14. The method of claim 13, further comprising: the cell phone receiving a query from the second device requesting an indication as to whether the cell phone contains one or more documents to be downloaded; and wherein transferring the document to the second device is performed in response to the indication that the document is included in the one or more documents to be downloaded.

15. The method defined in claim 13 further comprising the cell phone determining whether the second device is in proximity prior to transferring the index, the first key and the document to the second device.

16. The method defined in claim 13 further comprising:
    sending, by the cell phone, the first key to the first device prior to receiving the document;
    decrypting, by the cell phone, the document using a second key
    encrypting the document with a second key; and
    sending, by the cell phone, a second encrypted version of the document.

17. The method defined in claim 16 wherein the first key comprises a public key and the second key comprises a private key.

18. The method defined in claim 13 wherein, without user intervention, the document is received by the wireless transceiver, the query is received by the wireless transceiver, and the document is transmitted by the wireless transceiver.

* * * * *